(12) United States Patent
Radhakrishnan

(10) Patent No.: US 7,272,710 B2
(45) Date of Patent: Sep. 18, 2007

(54) CONFIGURATION AWARE PRE-FETCH SWITCH SETTING BY BIOS BASED ON THE NUMBER OF CPUS AND CACHE SIZE

(75) Inventor: Ramesh Radhakrishnan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 368 days.

(21) Appl. No.: 10/955,253

(22) Filed: Sep. 30, 2004

(65) Prior Publication Data

US 2006/0069910 A1    Mar. 30, 2006

(51) Int. Cl.
*G06F 1/24* (2006.01)

(52) U.S. Cl. .............................. 713/2; 713/1

(58) Field of Classification Search ............ 713/1, 713/2
See application file for complete search history.

(56) References Cited

U.S. PATENT DOCUMENTS

| | | | |
|---|---|---|---|
| 6,157,993 A * | 12/2000 | Lewchuk | 711/213 |
| 6,594,730 B1 | 7/2003 | Hum et al. | 711/137 |
| 6,651,153 B1 * | 11/2003 | Orfali | 711/170 |
| 6,795,899 B2 | 9/2004 | Dodd et al. | 711/137 |
| 2005/0132371 A1 * | 6/2005 | Lopez-Estrada | 718/100 |

* cited by examiner

*Primary Examiner*—Thomas Lee
*Assistant Examiner*—Albert Wang
(74) *Attorney, Agent, or Firm*—Baker Botts L.L.P.

(57) ABSTRACT

A default setting, associated with speculative transfers of information from a main memory to a cache memory, is selected for a system based on the number of CPUs and the size of instruction and/or data caches included in the system. A matrix relating the number of processors and the size of the memory caches may be stored in a system BIOS and used to aid in determining whether the speculative transfers should be enabled or disabled by default. In general, speculative transfers will be enabled by default if system performance is more likely than not to be enhanced by using speculative transfers. Speculative transfers will be disabled if system performance is likely to be degraded by use of speculative transfers.

20 Claims, 2 Drawing Sheets

|   | CACHE SIZE → | | | |
|---|---|---|---|---|
| | L1=12K<br>L2=512K<br>L3=0K | L1=12K<br>L2=512K<br>L3=1024K | L1=12K<br>L2=512K<br>L3=2048K | L1=12K<br>L2=512K<br>L3=4096K |
| 1 | ENABLE PRE-FETCH | ENABLE PRE-FETCH | DISABLE PRE-FETCH | ENABLE PRE-FETCH |
| 2 | ENABLE PRE-FETCH | DISABLE PRE-FETCH | DISABLE PRE-FETCH | ENABLE PRE-FETCH |
| 3 | DISABLE PRE-FETCH | DISABLE PRE-FETCH | ENABLE PRE-FETCH | ENABLE PRE-FETCH |
| 4 | DISABLE PRE-FETCH | DISABLE PRE-FETCH | DISABLE PRE-FETCH | ENABLE PRE-FETCH |

NUMBER OF PROCESSORS ↓

CONFIGURATION AWARE PRE-FETCH SWITCH SETTING BY BIOS BASED ON THE NUMBER OF CPUS AND CACHE SIZE

TECHNICAL FIELD

This disclosure relates generally to enabling or disabling a processor capability that allows processors to obtain instructions or data speculatively, and more particularly to enabling or disabling a default setting associated with speculative transfers to cache based on a system configuration.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Processors in many of these systems have the ability to obtain instructions or data from a main memory and place the instructions or data into a cache memory before the processor actually requires the instructions or data. Most processors can access information from cache memory much faster than from main memory. Improved system performance often results, because the faster access to information stored in cache memory can reduce the number of processor cycles wasted waiting for information to be retrieved from an associated main memory.

SUMMARY

An information handling system is provided with default settings for transferring information or data from a main memory to a cache memory according to the information handling system's specific configuration. A method of determining the default settings and software for implementing the method are also disclosed.

In systems including only a single processor, enabling information and data to be transferred from a main memory to a cache memory will usually have a positive impact on system performance, so the default setting will normally be to enable information and data to be obtained speculatively. In systems having more than one processor, however, and particularly where processors share a front side bus (FSB), enabling the speculative transfer of information to a cache may have an adverse impact on system performance due to increased memory access traffic.

Accordingly, in at least one embodiment, the BIOS of an information handling system is configured with a default setting that notifies system processors whether speculative obtaining of instructions and/or data is to be enabled.

In selecting the default setting, the BIOS determines how many central processing units (CPUs) are included in the information handling system, as well as the number and size of caches associated with the CPUs. Based on this configuration information, a default pre-fetch setting is selected. In at least one embodiment, the default value is set to "disabled" if the number of CPUs and the size of the memory cache is likely to result in increased front side bus (FSB) traffic, compared to the amount of FSB traffic likely to result if obtaining information speculatively were enabled.

To determine whether the speculative transfer of information from a main memory to a cache memory should be enabled by default, at least one embodiment employs a matrix that compares the size of the CPU caches with the number of CPUs. By cross referencing the number of processors with the cache sizes, the matrix provides a default setting, based on the configuration of the information handling system.

An information handling system according to an embodiment of the present disclosure includes one or more CPUs that include respective memory caches. The system also includes memory connected to the CPUs, and a BIOS having a default value for speculatively obtaining information based on the number of CPUs and the size of at least one of the memory caches. The BIOS may include a program of instructions that are executable to query the system to determine how many CPUs are in the system and the size of the CPUs respective caches. The BIOS can then enable or disable speculative transfer of information into cache memories by default, based on whether enabling such transfers would be likely to improve or degrade system performance.

BRIEF DESCRIPTION OF THE DRAWINGS

A more complete understanding of the present embodiments, and advantages thereof, may be acquired by referring to the following description taken in conjunction with the accompanying drawings, in which like reference numbers indicate like features, and wherein.

DETAILED DESCRIPTION

Figure 1:
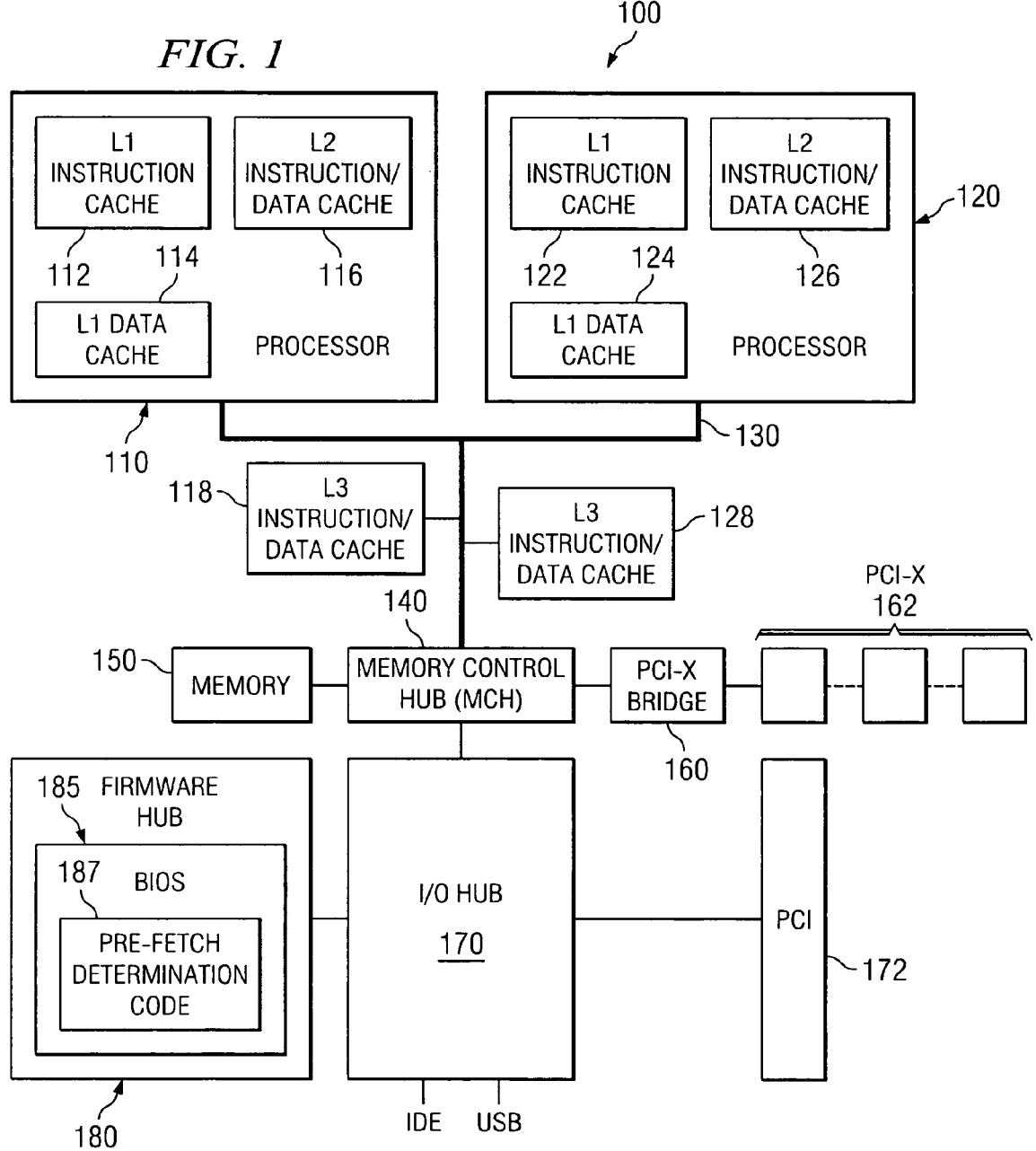
FIG. 1 is a block diagram illustrating a system having a configuration which allows determining default settings associated with speculative transfers of information and data according to an embodiment of the present disclosure.
Figures 2, 3:
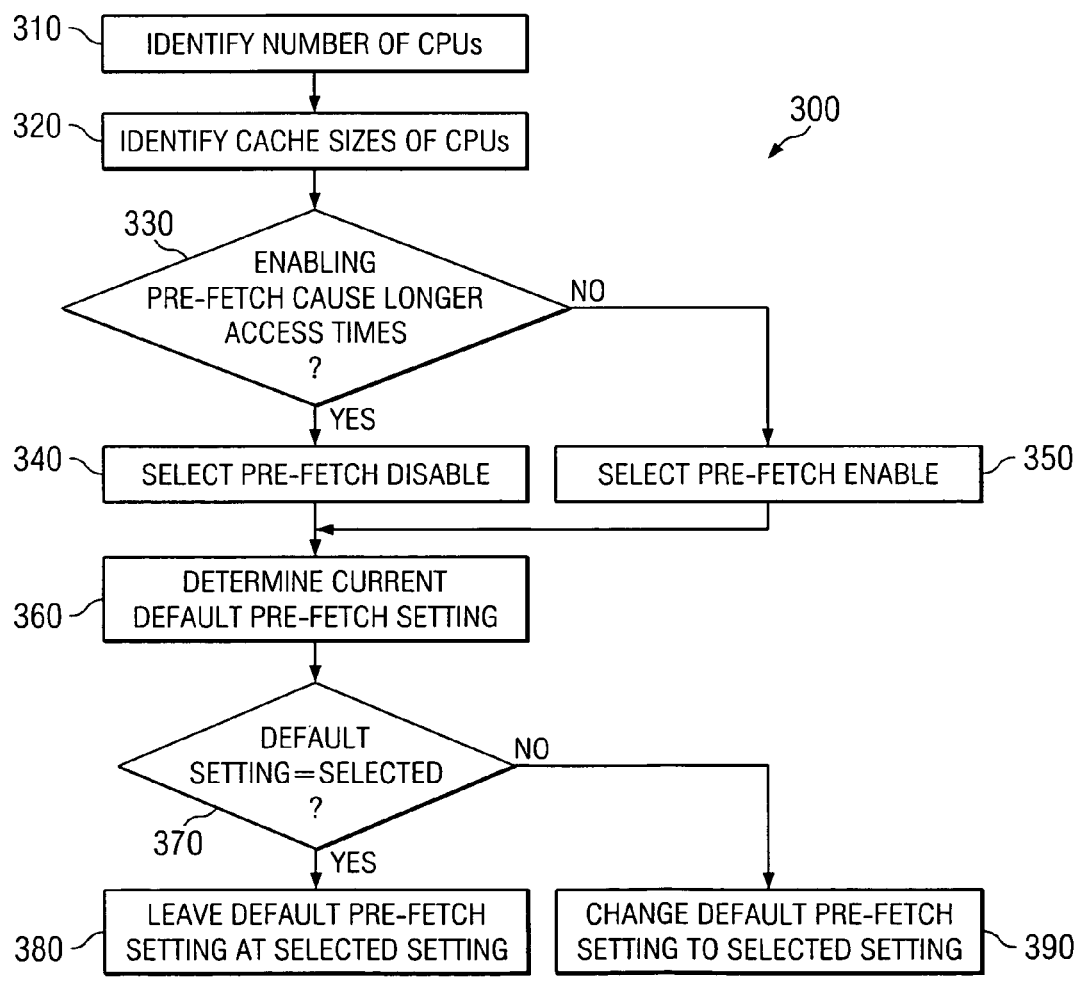
FIG. 2 is a diagram of a matrix used to determine whether a default setting associated with speculative transfers of information and data should be enabled or disabled according to an embodiment of the present disclosure.
FIG. 3 is a flow chart illustrating a method associated with speculative transfers of information and data according to an embodiment of the present disclosure.

Preferred embodiments and their advantages are best understood by reference to FIGS. 1 through 3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring first to FIG. 1, one such information handling system is illustrated, and designated generally as system 100. System 100 includes processors 110 and 120 connected via front side bus 130 to Memory Control Hub (MCH) 140. Processors 110 and 120 are also connected to level 3 (L3) instruction/data cache 118 and 128. MCH 140 is connected to memory 150, I/O Hub 170, and PCI-X bridge 160. Memory 150 generally contains RAM used to store instructions and data for use by processors 110 and 120. PCI-X bridge 160 interfaces with PCI-X buses 162 to permit use of various peripherals with system 100.

I/O Hub 170 is connected to firmware Hub 180 and PCI bus 172. PCI bus 172, like PCI-X bus 162, allows connection of various peripherals to system 100. Firmware Hub 180 may include, in at least one embodiment, BIOS 185, which in turn stores a program of executable instructions to implement pre-fetch determination code 187. In various forms, I/O Hub 170 is also connected to input/output devices via a USB bus, and an IDE bus (not illustrated).

Processors 110 and 120 each include a level 1 (L1) instruction cache 112 or 122, respectively, an L1 data cache 114 or 124, respectively, and a level 2 (L2) instruction/data cache 116 or 126, respectively. L1 and L2 instruction and data caches allow processor 110 and 120 to access data and instructions faster than would otherwise be possible if each processor had to obtain the same instructions and data from memory 150. L3 instruction/data caches 118 and 128 are associated with respective processors 110 and 120.

In operation, processors 110 and 120 may operate more efficiently if the L1-L3 caches are used to store speculative data or instructions. Such speculative transfer of information into a cache memory is sometimes referred to as pre-fetching. For example, a speculative load instruction may be used to pre-fetch instructions or data from memory 150 into one or more of the caches 112-118, so that processor 110 will have quick access to the data or instructions likely to be needed next. If processor 120 has previously pre-fetched any needed instructions or data, information can be delivered to caches 112-118 in response to the load instruction being executed by processor 110 without delay.

Consider another case, however, in which enabling pre-fetch can have an adverse impact on system performance. If processors 110 and 120 both attempt to pre-fetch information into their respective caches. Since the FSB is shared between processors 110 and 120, a first pre-fetch initiated by processor 110 may have to complete before a second pre-fetch initiated by processor 120 can deliver information to one of the caches 122-128. If the information returned in response to the pre-fetch initiated by processor 110 does not include the information actually needed by processor 110, then processor 110 may issue an immediate request for information from memory 150. In that case, processor 110 will either wait for the second pre-fetch initiated by processor 120 to complete (resulting in wasted processor cycles), or system 100 will interrupt the second pre-fetch to service the immediate request of processor 110. Interrupting the second pre-fetch will delay delivery of information to processor 120, so processor 120 may request immediate servicing of its information request. In situations such as the one just described, enabling pre-fetch can have an adverse impact on system performance.

The actual impact that pre-fetching has on system performance depends, at least in part, on the number of CPUs in the system and the cache sizes of the processors. In some cases, characteristics of an application being executed by the processors 110 and 120 will also impact the amount of FSB traffic and overall system performance.

More processors sharing front side bus 130 generally results in higher front side bus traffic, resulting in longer memory access times if pre-fetch is enabled. If the processor caches 112-118 and 122-128 are large, however, processors 110 and 120 may not have to access memory 150 as frequently. Consequently, front side bus traffic will be lower when using processors with larger caches. Thus, in general, the more processors included in system 100, the more likely it is that performance will not be improved by enabling the pre-fetch function of the processors. Conversely, the larger the size of the L1-L3 caches, the more likely it is that enabling pre-fetch will improve system performance.

In at least one embodiment, the status of the default pre-fetch setting for processors 110 and 120 is obtained from BIOS 185. During power-up initialization, processors 110 and 120 may obtain boot instructions and data from BIOS 185. Included in the information obtained from BIOS 185 is a default value indicating whether pre-fetch is to be enabled or disabled.

In at least one embodiment, the default pre-fetch value is stored in BIOS 185 by a manufacturer or vendor during system configuration. For example, once a vendor knows that system 100 will be provided with two processors, and that each processor will have particular cache sizes, the vendor or manufacturer can program the BIOS with a default pre-fetch value consistent with the known system configuration.

In some embodiments a BIOS configuration sub routine, such as pre-fetch determination code 187, may be executed during manufacturing, system configuration, or otherwise, to automatically set the default pre-fetch value in BIOS 185 to an appropriate value based on the system's configuration.

In some such embodiments, pre-fetch determination code 187 is used to determine the number of processors included in system 100. The number of CPUs may be reported to BIOS 185 by memory controller hub 140, based on physical properties of the front side bus or the processors. For example, the number of processors in the system may be determined by dip switch settings on a mother board, line resistance values and/or terminators connected to one or more available CPU mounting locations, or the like. Alternatively, pre-fetch determination code 187 may prompt a user to input the number of central processors and/or the number and size of cache memories associated with each processor.

In some embodiments, system 100 is capable of detecting CPUs which are present, and determining cache sizes associated with the CPUs, based on a CPU serial number, processor type, or similar information. It will be appreciated that various techniques for obtaining information about CPUs and their associated cache memories are well known to those skilled in the art.

Once pre-fetch determination code 187 has determined the number of processors and the size of memory caches associated with the processors, a determination is made regarding whether to enable pre-fetch or disable pre-fetch.

Referring next to FIG. 2, a matrix used by various embodiments for determining a default pre-fetch setting will be discussed. By cross-referencing the size of the L1-L3 memory caches with the number of processors included in the system, the matrix illustrated in FIG. 2 allows BIOS pre-fetch determination code 187 (FIG. 1) to select an appropriate pre-fetch setting to improve overall system performance, or at least to avoid adversely impacting system performance.

Note that the matrix of FIG. 2 illustrates increasing cache sizes from left to right and an increasing number of processors from top to bottom. In general, the fewer processors included in a system the more likely it is that enabling pre-fetch will improve system performance. So, for example, based on the matrix illustrated in FIG. 2, if only one processor is included in a system, then pre-fetch will be disabled for all cases except where the L3 cache is 2048 K. Where four processors are included in a system, pre-fetch will be disabled in all cases except where the L3 cache is 4096 K.

Although a particular matrix is illustrated in FIG. 2, different matrices may be employed for different system configurations or BIOS types. So, for example, although matrix 202 shows disabling pre-fetch for a one processor system including an L3 2048 K cache, different processor types, different L1-L2 cache types, different cache sizes, or various other system configuration parameters may dictate using a matrix different from matrix 200. Not that in some embodiments, pre-fetch determination code 187 (FIG. 1) may be implemented using data structures other than a matrix, and may take into account more or fewer variables than those illustrated in FIG. 2.

Referring next to FIG. 3, a method according to an embodiment of the present invention will be discussed. Method 300 begins at 310, where the number of CPUs in a system is identified. The number of CPUs may be obtained by user input, or through any of other various component identification methods known to those skilled in the art.

At 320, the number and size of caches available to the CPUs is identified. As with identifying the number of CPUs, identifying cache sizes available to CPUs can be performed by automatically identifying the type of CPUs, obtaining the CPU type via manual input, or through any of various suitable methods of system component identification known to those skilled in the art.

At 330 method 300 determines whether enabling pre-fetch for one or more processors would cause longer memory access times than would occur with pre-fetch disabled. This determination can be made according to a matrix, as illustrated in FIG. 2, based on a lookup table, which may include information gathered empirically, or otherwise. In at least one embodiment, the determination to enable or disable pre-fetch is made by a system BIOS.

If enabling pre-fetch would cause longer memory access times due to, for example, increased FSB traffic, then the default value of pre-fetch is set to disable in 340. If, however, enabling pre-fetch would not cause longer access times, then the pre-fetch default setting is set to enable at 350.

It should be noted that although the illustrated embodiment determines the default pre-fetch value based on whether enabling pre-fetch would make system performance worse than if pre-fetch were disabled, in other embodiments different decision criteria may be used. Pre-fetch may be enabled, for example, if enabling pre-fetch is estimated to provide more than a predetermined amount of improvement in system performance. Alternatively, pre-fetch may be enabled unless 330 determines that enabling pre-fetch would be likely to degrade system performance by more than a predetermined amount.

The method proceeds to 360, where the current default value of the pre-fetch setting is read from the BIOS. This current default setting may, or may not, be the same as the desired default setting of pre-fetch selected at 340 or 350.

At 370, method 300 compares the current default pre-fetch setting to the pre-fetch setting selected in either 340 or 350. If the selected pre-fetch setting is the same as the current, default pre-fetch setting the method proceeds to 380, leaving the current default pre-fetch setting as is. If, however, the selected pre-fetch setting is not the same as the default pre-fetch setting, method 300 proceeds to 390, where the default pre-fetch setting is modified to reflect the selected pre-fetch setting.

Although method 300 has been presented as including a particular order of actions to be performed, additional or fewer actions may be included in method 300, or the order of the actions may be modified, without departing from the spirit and scope of the present disclosure. Method 300, for example, may perform action 390 regardless of any previous setting of the pre-fetch enable setting. In such an embodiment, actions 370 and 380 need not be performed.

Although the disclosed embodiments have been described in detail, it should be understood that various changes, substitutions and alterations can be made to the embodiments without departing from their spirit and scope.

What is claimed is:

1. An information handling system comprising:
   one or more central processing units (CPUs) comprising respective processor caches;
   memory coupled to the one or more CPUs; and
   a BIOS comprising a default value associated with speculative transfers of information to cache memory, wherein the BIOS is configured to:
   receive data indicating the number of the one or more CPUs and a size of at least one of the respective processor caches; and
   automatically set the default value associated with speculative transfers of information to cache memory based at least on the received data indicating the number of CPUs and the size of at least one of the respective processor caches.

2. The information handling system of claim 1, further comprising a plurality of CPUs coupled to each other and to the memory via a shared front-side bus.

3. The information handling system of claim 1, wherein the default value indicates that speculative transfers to cache are to be disabled if disabling the speculative transfers is likely to result in less front-side bus traffic than enabling the speculative transfers.

4. The information handling system of claim 1, wherein the BIOS comprises at least one executable instruction to automatically set the default value based on a matrix comparing the number of CPUs with the cache sizes of the CPUs.

5. The information handling system of claim 1, further comprising a level 3 cache, and wherein the BIOS comprises at least one executable instruction to set the default value to enable speculative transfers to cache if the level 3 cache is greater than 2048 kilobytes, regardless of the number of CPUs.

6. The information handling system of claim 1, further comprising means for determining the number of processors and a cache size of at least one processor.

7. The information handling system of claim 1, further comprising means for changing the default value.

8. A method comprising:
identifying a number of central processing units (CPUs) included in an information handling system;
identifying a cache size of at least one of the number of CPUs; and
automatically selecting a pre-fetch setting in a BIOS of the information handling system based at least on the number of CPUs and the cache size of at least one of the number of CPUs.

9. The method of claim 8, further comprising configuring a default pre-fetch setting based on the selected pre-fetch setting.

10. The method of claim 9, further comprising setting a default pre-fetch setting in the BIOS of the information handling system.

11. The method of claim 8, wherein selecting a pre-fetch setting includes enabling or disabling pre-fetch, the method further comprising selecting the pre-fetch setting to disable pre-fetch if enabling pre-fetch is likely to result in longer memory access times compared to disabling pre-fetch.

12. The method of claim 11, further comprising automatically selecting the pre-fetch setting based on a matrix relating the number of CPUs with cache sizes of the CPUs.

13. The method of claim 8, further comprising selecting the pre-fetch setting to enable pre-fetch if a level 3 cache size is greater than 2048 kilobytes, regardless of the number of CPUs.

14. A computer readable medium tangibly embodying a program of executable instructions, the program of executable instructions comprising:
at least one instruction executable to identify a number of central processing units (CPUs) included in an information handling system;
at least one instruction executable to identify a cache size of at least one of the number of CPUs; and
at least one instruction executable to automatically select a pre-fetch setting in a BIOS of the information handling system based on the number of CPUs and the cache size of at least one of the number of CPUs.

15. The computer readable medium of claim 14, further comprising at least one instruction executable to configure a default pre-fetch setting based on the selected pre-fetch setting.

16. The computer readable medium of claim 15, wherein the default pre-fetch setting comprises the BIOS setting of an information handling system.

17. The computer readable medium of claim 15, further comprising at least one instruction executable to change the default pre-fetch setting in response to user input.

18. The computer readable medium of claim 14, wherein selecting a pre-fetch setting includes enabling or disabling pre-fetch, the computer readable medium further comprising at least one instruction executable to select the pre-fetch setting to disable pre-fetch if enabling pre-fetch is likely to result in longer memory access times compared to disabling pre-fetch.

19. The computer readable medium of claim 18, further comprising at least one instruction executable to automatically select the pre-fetch setting based on a matrix relating the number of CPUs with cache sizes of the CPUs.

20. The computer readable medium of claim 14, further comprising at least one instruction executable to selecting the pre-fetch setting to enable pre-fetch if a level 3 cache size is greater than 2048 kilobytes, regardless of the number of CPUs.

* * * * *